Patented Aug. 20, 1940

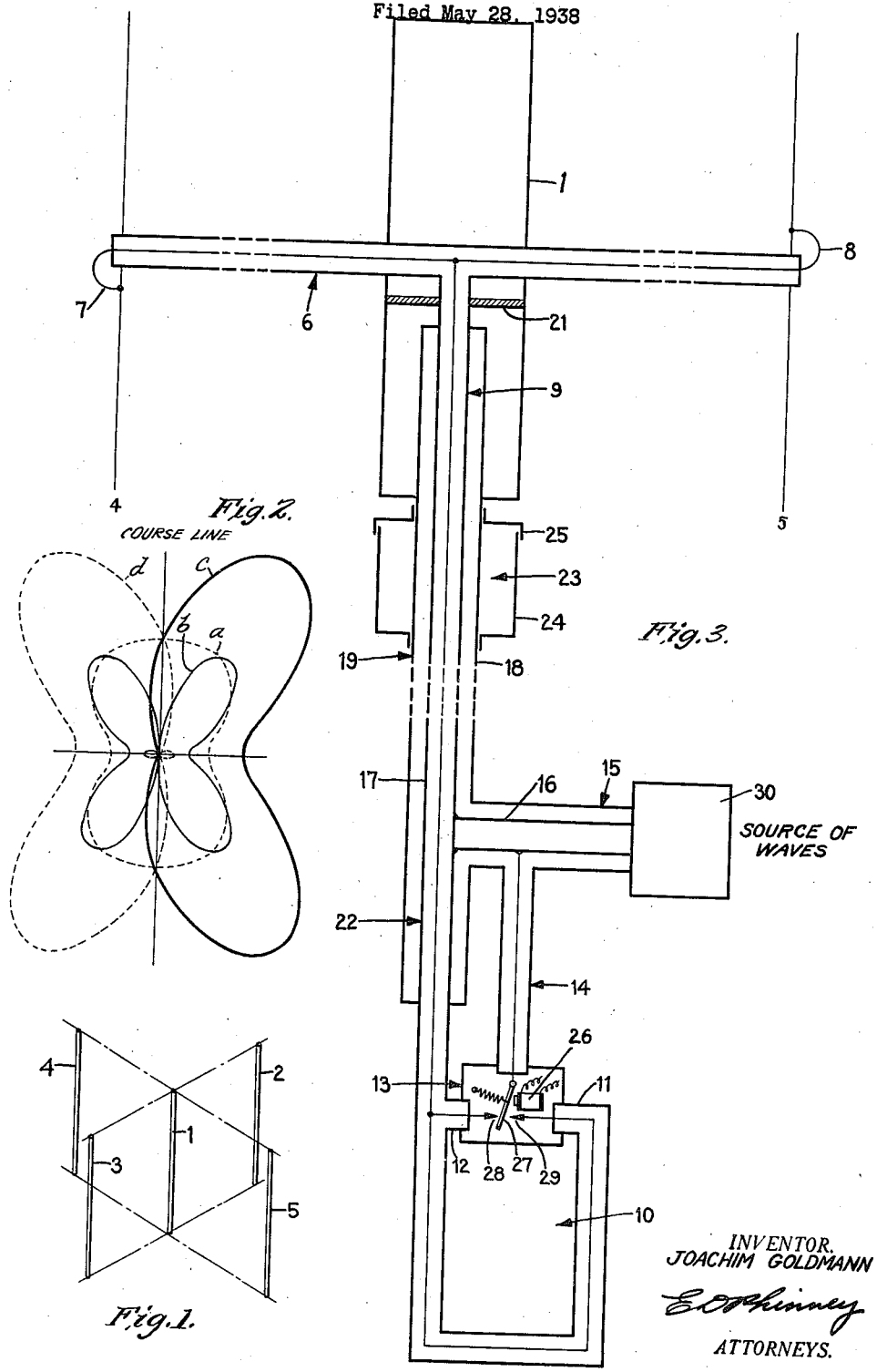

2,212,230

UNITED STATES PATENT OFFICE 2,212,230

AIRPLANE GUIDING BEACON

Joachim Goldmann, Berlin-Wilmersdorf, Germany, assignor to International Telephone Development Co. Inc., New York, N. Y., a corporation of Delaware Application May 28, 1938, Serial No. 210,675

9 Claims. (Cl. 250—11)

This invention relates to directive antenna systems and pertains more particularly to course beacons for use in conjunction with aerial or other navigation.

It is an object of my invention to provide a radio beacon system for the guidance of airplanes or other vehicles, which is adapted to produce a radiation pattern keyed in such manner as to give a course line along an axis of equal field strength, while at the same time giving off-course indications in all compass directions.

A further object of my invention is to provide a radio beacon system for guiding airplanes or other vehicles wherein a radiation pattern is produced which gives a very sharply defined course line with a small expenditure of energy.

A still further object of my invention is to provide an improved form of directional dipole antenna array and feeding means therefor, for use in carrying out the objects above mentioned.

Still another object of my invention is to provide a dipole antenna array comprising three dipoles and feeding means therefor, and keying means for two of said dipoles, the entire arrangement being adapted to produce simply and easily a keyed radiation pattern adapted for use in radiating waves for the formation of course lines.

In accordance with my invention I provide an array of dipoles vertically disposed and symmetrically arranged around an axis line in some compass direction, one dipole symmetrically and centrally arranged with respect to the others being continuously energized, the resulting pattern from this single dipole preferably being modified by two parasitic dipoles spaced one on each side thereof in such manner as to give a resulting radiation pattern of an oblong shape extending along said axis line. In conjunction with the center dipole and its two parasitic dipoles, two additional dipoles are provided one on each side of the center dipole, so that a line extending between these two additional dipoles is substantially at right angles to said axis line. These two additional dipoles are energized in opposite phase relation, the energization thereof being controlled by a keying mechanism which periodically reverses the phase relationship of the energy supplied to the two dipoles with respect to the energy supplied to the center dipole. The distance between the two additional dipoles and the phase relation between their energization and that of the center dipole are so selected that a resulting total radiation pattern is produced having four lobes, two of which exist when the phase relation of the two additional dipoles is in one sense, with respect to the radiation from the central dipole, and the other two of which exist when the phase relation of the two additional dipoles is reversed with respect to the radiation from the central dipole. The total four lobed pattern may be used to determine a course line along a line of equal field strength in the usual manner.

For producing the radiation pattern above described, in accordance with my invention, I provide a dipole centrally disposed between two other dipoles, all three of these dipoles being interconnected to a common coaxial transmission line with which is associated a keying arrangement whereby the phase relation of the radiation from the two outer dipoles may be periodically reversed with respect to the radiation from the center dipole. With this arrangement the radiation from the two outer dipoles may be keyed in such manner as periodically to change the phase relationship thereof with respect to the phase of the radiation from the center dipole so that the total radiation pattern lies first at one side and then at the other side of the desired course line.

For carrying out this feature of my invention I provide a coaxial transmission line which supplies energy to the center dipole along a first path and to the two outer dipoles through a second path the length of which is increased periodically one-half wave length by keying.

The above mentioned and further objects and advantages of my invention and the manner of obtaining them will be more fully explained in the following description taken in conjunction with the accompanying drawing.

In the drawing—

Fig. 1 illustrates diagrammatically a radio beacon array embodying my invention, Fig. 2 is a curve showing the radiation pattern of a beacon constructed in accordance with my invention, and Fig. 3 illustrates diagrammatically in side elevation and partly in section an antenna array and energizing and keying means therefor, embodying the principles of my invention.

Referring more particularly to the drawing, reference numerals 1, 2, 3, 4 and 5, indicate vertically disposed dipole antennae arranged in the form of a beacon array for producing radiation patterns defining a course line, for the guidance of airplanes or other moving vehicles. The dipoles 1, 2 and 3 are arranged in line, the dipoles 2 and 3 being for the purpose of altering to substantially oblong shape the radiation pattern produced by the center or main dipole 1. The two dipoles 2 and 3 are preferably of the parasitic type. Dipoles 4 and 5 are also arranged in line with the main dipole 1, this line being at right angles to the course line. These two dipoles are fed in opposite phase relation and are so keyed that the phase thereof is periodically shifted with respect to that of the center dipole 1 so that at points remote from the array and adjacent to the course line the radiation from the dipole 4 alternately subtracts from and adds to that from the center dipole 1. At the time when the radiation from dipole 4 adds to that from the dipole 1, the radiation from dipole 5 subtracts from that of the dipole 1 and vice versa, whereby the radiation pattern is periodically shifted. In Fig. 2, $a$ is a curve representing the radiation from the main or center dipole 1, as modified by the effect of dipoles 2 and 3, and $b$ is a curve representing the radiation from the dipoles 4 and 5. When the dipoles 4 and 5 are keyed in one phase relation with respect to the center dipole 1, the total radiation assumes the form shown by curve $c$, whereas, while when the dipoles 4 and 5 are keyed in the opposite phase relation with respect to the radiation from the center dipole 1, the total radiation is represented by curve $d$. The keying is preferably carried out in the well known $a$—$n$ or equivalent fashion, and the course line, lying on the point of equal field strength of the radiations $c$ and $d$, may be determined in the usual well known way.

To produce these radiation patterns the distances between the dipoles 2 and 3, and the dipoles 4 and 5 are determined experimentally, but in general it will be found that satisfactory results may be obtained when the distance between the dipoles 2 and 3 is about $.6\lambda$ at the operating frequency, while the distance between the dipoles 4 and 5 is about $.92\lambda$ at the operating frequency. In all cases the last mentioned distance will be slightly less than one wavelength.

Referring again to the radiation patterns produced by the beacon, it will be noted that the radiation patterns $c$ and $d$ have a very sharp angle between them, whereby a very sharply defined course line is obtained. Furthermore, that this sharpness is obtained with a comparatively small amount of power, will be clear from a consideration of Fig. 2 as a whole.

Referring to Fig. 3, 1, 4 and 5 indicate the dipoles 1, 4 and 5, respectively, of Fig. 1. These are interconnected by means of a coaxial line 6 which is connected as shown at 7 and 8, so as to energize the two dipoles 4 and 5 in opposite phase relationship. Connected to the center of coaxial line 6 is a second coaxial line 9 terminating at its lower end in a loop 10 having two ends 11 and 12 which project into a relay box 13. A third coaxial line 14 likewise extends into the relay box 13 and at its other end connects with a main coaxial transmission line 15, the latter being of larger dimensions than the coaxial lines previously mentioned. The inner conductor 16 of the transmission line 15 is also connected to the outer conductor 17 of transmission line 9, while the outer conductor of the transmission line 15 is connected to a tube 18 which, with the conductor 17 of line 9, forms still another coaxial transmission line concentric with line 9 and indicated generally by reference numeral 19.

Surrounding the upper end of tube 18 is a cylindrical dipole 1 which has adjacent the center thereof a disc 21 forming a connection between the inside of the dipole 1 and the conductor 17, the latter being the inner conductor of transmission line 19, and the outer conductor of transmission line 9. The lower end of the transmission line 19 has an extension 22 which is preferably substantially $$\frac{\lambda}{4}$$

in length at the operating frequency and acts as an open circuit at the lower end of transmission line 19, so that the latter operates as if the line were cut off just below its point of junction with the main supply line 15. If desired, the length of section 22 may be slightly varied from the $$\frac{\lambda}{4}$$

value for matching purposes. If desired a tank circuit 23 formed of flanged tubular members 24 and 25 attached to the tube 18 may be provided to prevent the passage of radio waves down the outside of the tube 18. Such an arrangement is disclosed in the co-pending application, Serial No. 204,735, filed April 28, 1938, of Frederick A. Kolster.

Inside of the relay box 13 is positioned a relay mechanism 26 having an armature 27 which is adapted to be moved into engagement with either contact 28 or contact 29 of the coaxial line 9. When this armature is in contact with contact 29, the energy supplied to the dipoles 4 and 5 is 180° out of phase with the energy supplied to these dipoles when the armature 27 is in contact with 28. This is so, since the electrical length of the loop 10 is made one-half wavelength at the operating frequency. The length of the line 14 is selected so that at points near the course line and remote from the beacon the radiation from one of the dipoles 4 and 5 is in phase with that from the center dipole 1, as modified by the radiations for cooperating antennae such as 2 and 3, if they are employed, so that the radiations from the center dipole and from the one of dipoles 4 and 5 which is in phase therewith, reach a point in the operating area of the beacon in phase with one another and add together, while the radiations from the other dipole subtract from the radiation of the center dipole 1 and at a point in space reduce the field thereof. In practice the powers supplied to the dipoles 1, 4 and 5 are preferably so related that at any given instant of time a radiation pattern is produced mainly on one side only of the desired course line, as shown for example at $c$ in Fig. 2.

In practice energy is supplied to the main coaxial transmission line 15 from a suitable source 30, this passing by way of conductors 17 and 18 to the center dipole 1 with which the end of conductor 18 is capacitatively coupled, and to a point near the center of which the conductor 17 is conductively connected by the disc 21. As a result the center dipole produces radiations, the voltage distribution along the dipole being such that maximum voltage occurs at the ends thereof, the node being at the point where the coaxial line 6 passes through the dipole 20.

While energy is being radiated from the center dipole 20, power is being transmitted through the coaxial lines 14, 9 and 6 to the dipoles 4 and 5. When the armature 27 of keying relay 26 is at the left hand position as shown in Fig. 3, the energy is supplied directly from the line 14 to the line 9 without passing through the phase delay loop 10. On the other hand, when the armature 27 is in a right hand position the energy is passed through the phase delay loop 10 from the line 14 to line 9 with the result that in the latter case the dipoles 4 and 5 are energized 180° out of phase with the energization thereof when the armature 27 is in the first mentioned position. In the meantime the energization of the dipole 1 is not changed. The result is a shift of the total radiation from the antenna array from the pattern shown in Fig. 2 at c, for example, to that shown at d. While the tank circuit 23 may be eliminated, it is preferably used in order to prevent the flow of energy down the outside of tube 18. This tank circuit is so tuned as to form a high impedance to the waves just mentioned and thereby creates the effect of an insulator in the tube 18 at the lower end of dipole 1 so far as waves travelling on the outside of the tube 18 are concerned.

The construction just described above is very simple and compact; therefore, is easy to construct and simple to transport as a unit if desired. The three conductors, including the two conductors of coaxial line 9 and the tube 18 surrounding them, form in operation two coxial lines symmetrically arranged and shielded from outside interference. The remaining connections likewise are fully shielded and are symmetrically disposed.

While I have above described, in connection with the preferred embodiment, the antenna array as utilizing two dipoles, 2 and 3, to modify the radiation from dipole 1, these two dipoles may be eliminated and if so the radiation from dipole 1 would have a circular form instead of the oblong form shown in Fig. 2. In either case the desired course line may be determined from the beacon radiations at the intersection of the radiation patterns c and d, while at the same time off-course indications of sufficient strength to be readily received by airplanes within the working range of the beacon are given around the other points of the compass even along a line at right angles to the course line. This feature is of considerable value since while a very sharp course indication is attainable with a small expenditure of energy, it is still possible for an airplane pilot who is badly off his course or is approaching the beacon from a position at right angles to the course line, to obtain an indication of his position.

It will be understood that suitable matching means known in the art will be employed at points of discontinuity such as the junctions at which one coaxial line branches into two lines. Also the stub 22 which is ordinarily tuned to simulate an infinite impedance may, as previously mentioned be slightly varied in length to present a finite impedance for matching purposes. Furthermore, this stub may be ¾λ or ⁵⁄₄λ in length instead of ¼λ since any of these lengths present an effective electrical length of ¼λ.

While I have described and shown certain particular embodiments to illustrate my invention, it will be understood that modifications, adaptations and variations thereof occurring to one skilled in the art may be made without departing from the scope of the invention as defined in the appended claims.

What is claimed is:

1. A beacon for guiding airplanes along a desired path which comprises means for producing a first radiation pattern of a given frequency having a four-lobed shape having oppositely phased components on opposite sides of said path, means for simultaneously producing a second substantially concentric radiation pattern of said same frequency having a roughly oblate shape having like phased components on opposite sides of said path, and means for changing the phase of said first pattern relative to said second pattern.

2. A beacon for guiding airplanes along a desired path which comprises means for producing a four-lobed radiation pattern of a given frequency having oppositely-phased components on the two sides of said path, means for simultaneously producing a further substantially concentric pattern of said same frequency having like-phased components on the two sides of said path, and means for periodically changing the phase relation between said four-lobed and further patterns.

3. A beacon for guiding airplanes along a desired path which comprises means for producing a first radiation pattern of a given frequency having oppositely-phased components on the two sides of said path and having intensity minima in the directions normal to said path, means for producing a further substantially concentric pattern of said same frequency having like-phased components on the two sides of said path, and means for periodically changing the phase relation between said first and further pattern.

4. A beacon for guiding airplanes along a desired path which comprises means for producing a four-lobed radiation pattern of a given frequency, two lobes of which extend obliquely with respect to said path on one side thereof and are of one phase and the other two lobes of which extend obliquely with respect to said path on the opposite side thereof and are of opposite phase, means for producing a further radiation pattern substantially concentric with said first pattern of the same frequency having components of like phase on both sides of said path, and means for periodically varying the phase relation between said four-lobed pattern and said further pattern so that during one period said patterns reinforce each other on said one side of the path and oppose each other on said opposite side of the path and during another period said patterns oppose each other on said one side of the path and reinforce each other on said opposite side of the path.

5. A beacon for guiding airplanes along a desired path which comprises a first radiating system including two similar radiating elements symmetrically disposed about said path, and means for feeding waves to said elements in phase opposition to produce a first radiation pattern symmetric about said path but of opposite phase on the two sides of said path, the spacing of said elements being less than one wavelength of said wave by a fraction which is so small that said pattern has an intensity minimum in the direction normal to said path but which is so large that the intensity in said direction is readily receivable by airplanes to be guided, a second radiating system symmetric with respect to said path and adapted to produce a second radiation pattern substantially concentric with said first pattern also symmetric about said path but of constant phase throughout, said second pattern being in phase with one of said opposite phases of said first pattern, and means for periodically reversing the relative phase of said first and second patterns.

6. A radiating system comprising a source of waves, a triple conductor line having three conductors coaxially disposed successively within one another so that the two outermost conductors form a first transmission path and the two innermost conductors form a second transmission path, connections for energizing said first and second paths in parallel from said source, a hollow central radiator adjacent one end of said triple conductor line, two side radiators symmetrically disposed about said central radiator, two transverse lines connected respectively to said side radiators and extending symmetrically to the center of said central radiator, connections from said triple conductor line to said central radiator for energizing said central radiator from said first transmission path, and further connections from said triple conductor line to said transverse line for energizing said transverse line from said second transmission path.

7. A radiating system comprising a source of waves, a triple conductor line having three conductors coaxially disposed successively within one another so that the two outermost conductors form a first transmission path and the two innermost conductors form a second transmission path, a first connecting line connected to said source and extending to said first path, a second connecting line of coaxial form connected to said source and extending through the surface of the outermost conductor to said second path, a stub tube branching from said outermost conductor at the point where said second connecting line extends through the surface thereof and surrounding said second connecting line and connected thereto at its free end to form therewith a shorted coaxial line stub connected in shunt to said first path, said line stub having an effective electrical length of substantially one-quarter wavelength at the frequency of said source.

8. A radiating system comprising a source of waves, a triple conductor line having three conductors coaxially disposed successively within one another so that the two outermost conductors form a first transmission path and the two innermost conductors form a second transmission path, connections for energizing said first and second paths in parallel from said source, a hollow central radiator adjacent one end of said triple conductor line, two side radiators symmetrically disposed about said central radiator, two transverse lines connected respectively to said side radiators and extending symmetrically to the center of said central radiator, connections from said triple conductor line to said central radiator for energizing said central radiator from said first transmission path, further connections from said triple conductor line to said transverse line for energizing said transverse line from said second transmission path, and means included in said connections for energizing said paths from said source for periodically reversing the phase of the energization of said first path with respect to the phase of the energization of said second path.

9. A system according to claim 7, wherein said means for periodically reversing the phase of the energization of said first path with respect to said second path comprise two line branches differing in length by one-half wavelength at the frequency of said source, and means for alternately rendering one and then the other of said branches effective.

JOACHIM GOLDMANN.